United States Patent Office 2,886,978
Patented May 19, 1959

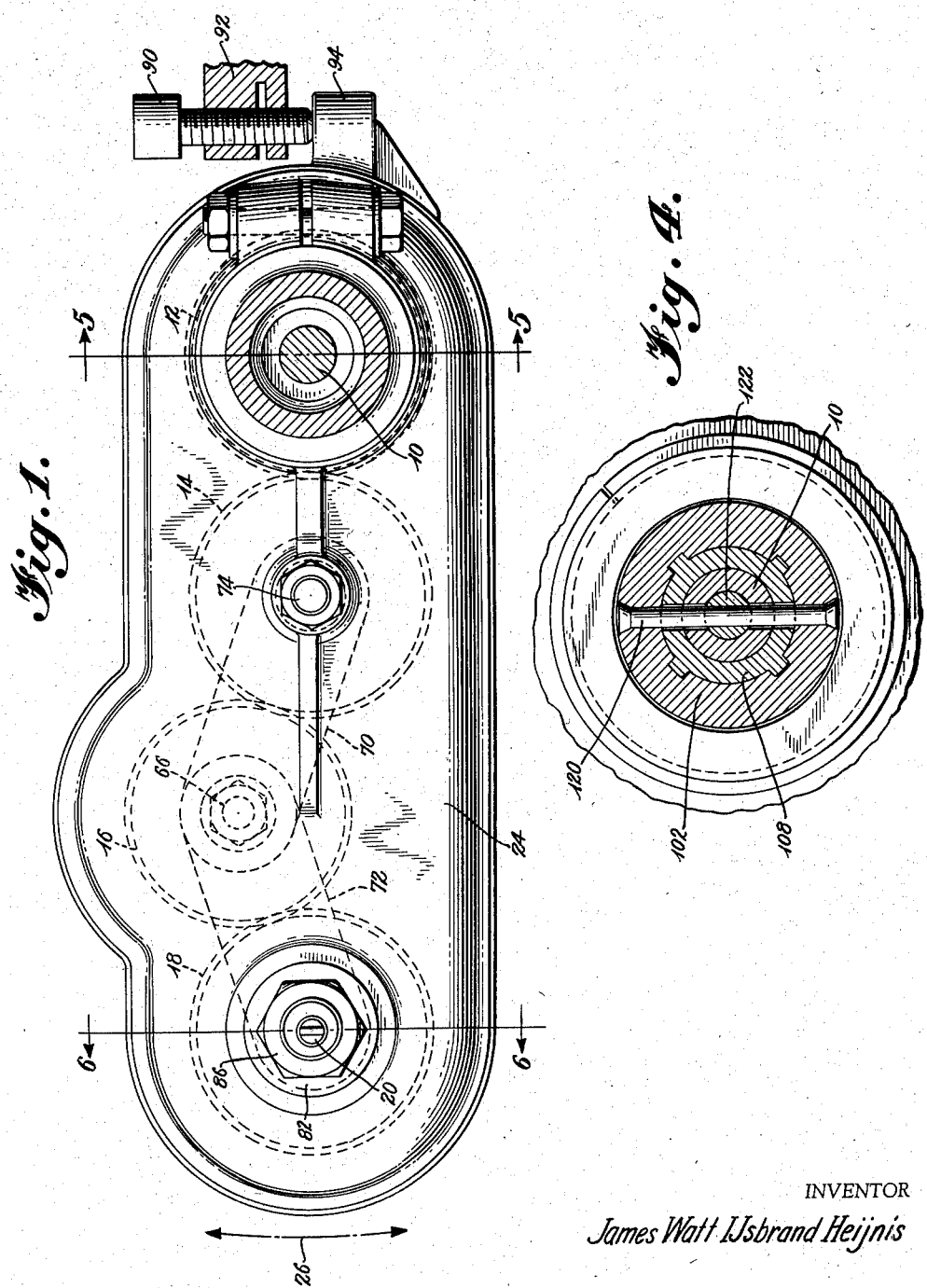

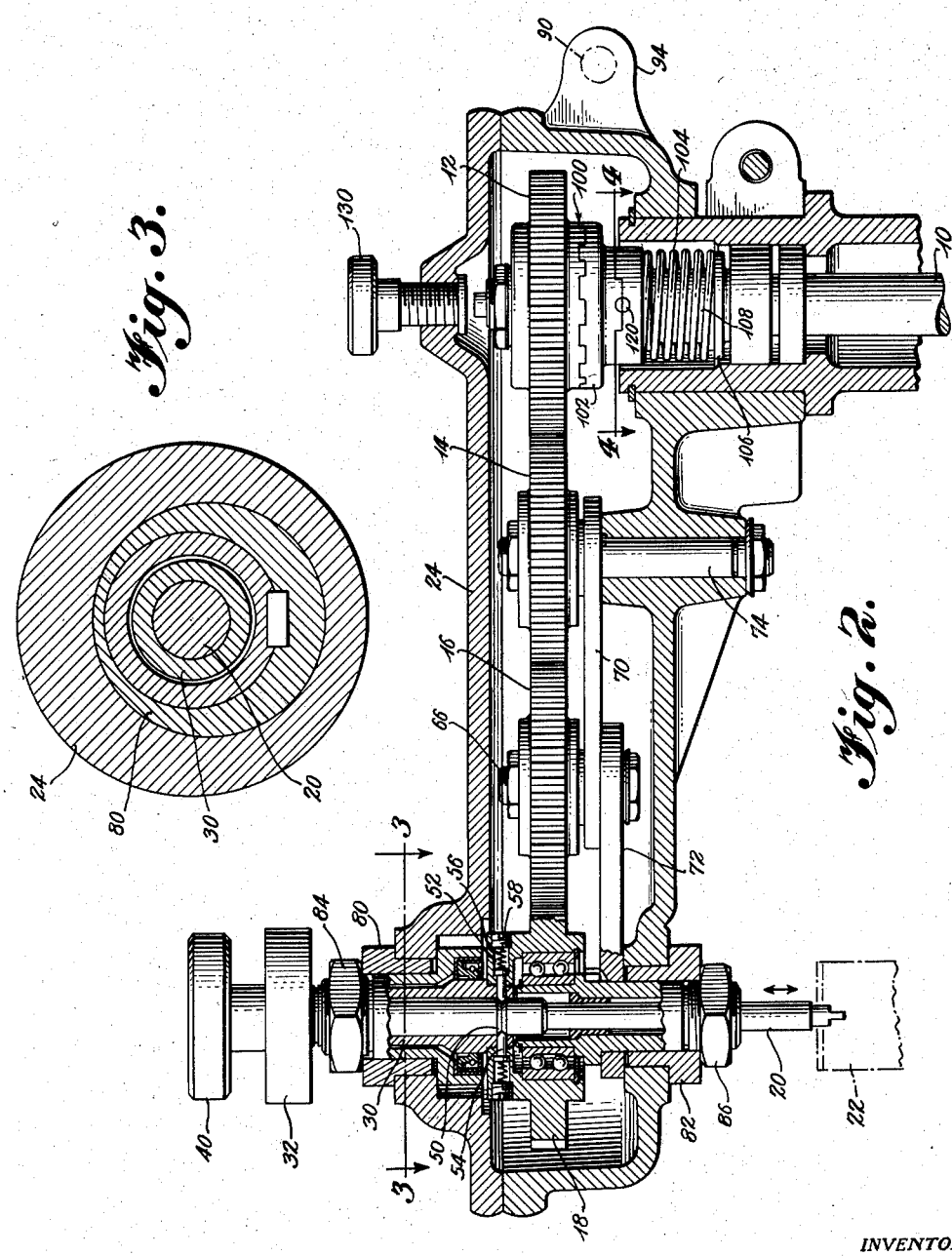

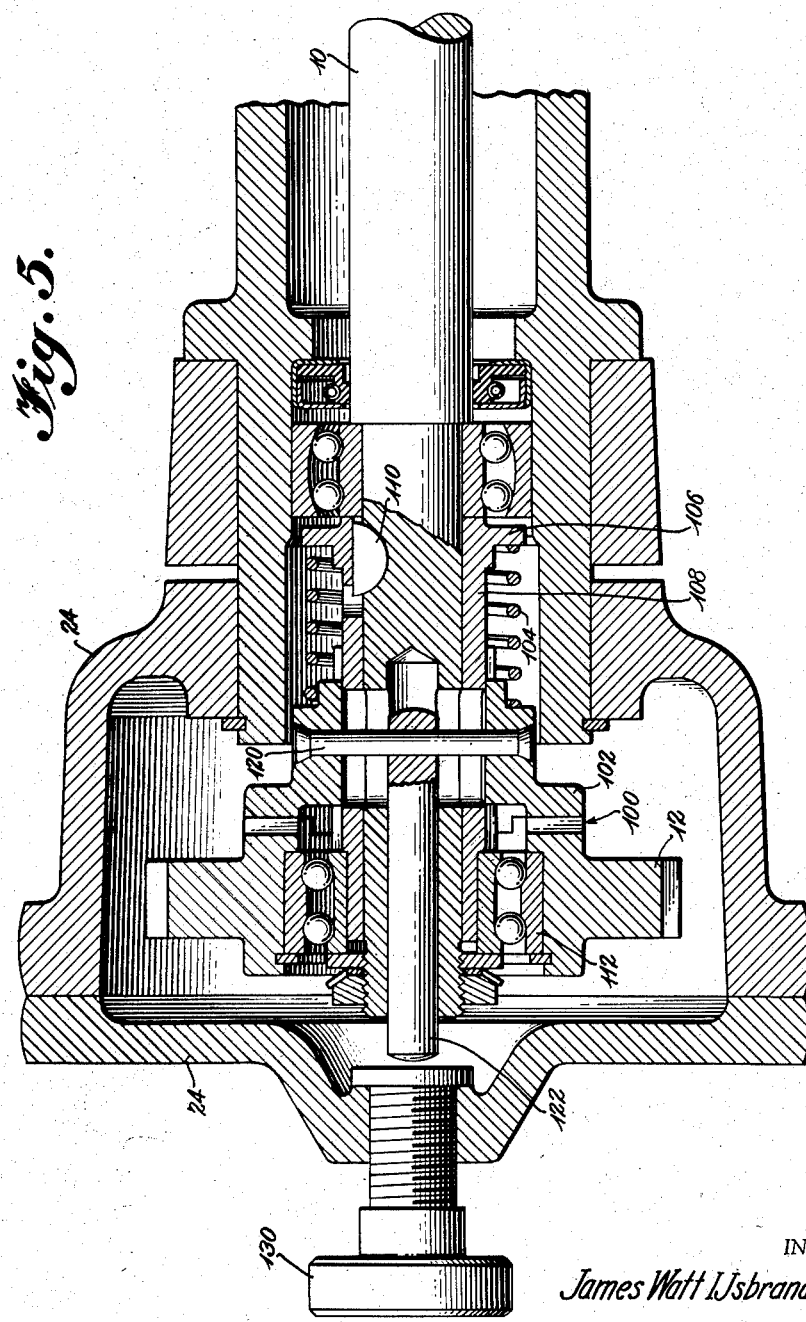

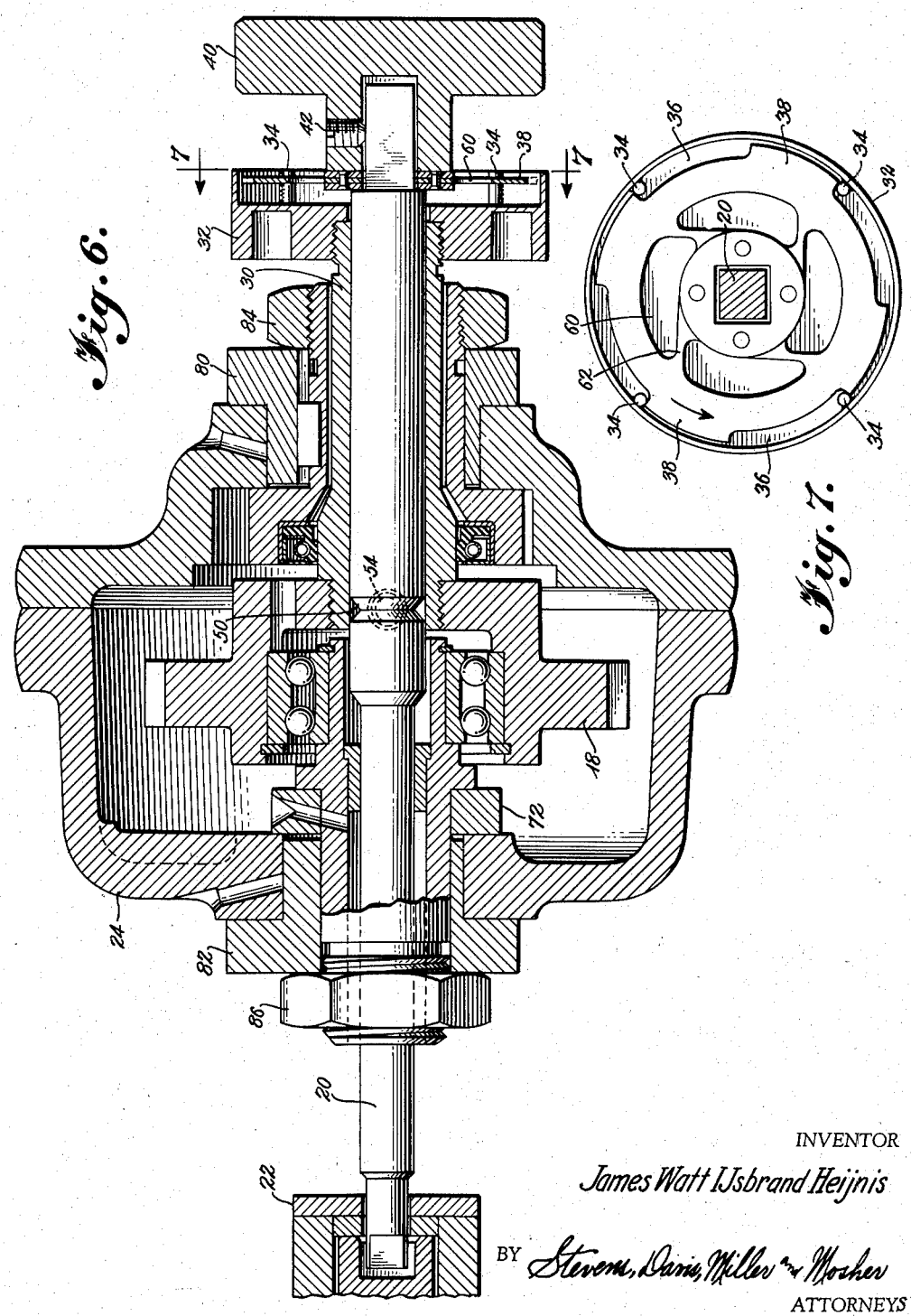

2,886,978
TRANSMISSION ASSEMBLY FOR A MELT-SPINNING APPARATUS

James Watt Ijsbrand Heijnis, Arnhem, Netherlands, assignor, by mesne assignments, to American Enka Corporation, Enka, N.C., a corporation of Delaware Application March 5, 1953, Serial No. 340,621

Claims priority, application Netherlands March 7, 1952

7 Claims. (Cl. 74—405)

This invention relates to meltspinning apparatus which includes an arrangement whereby gear wheel pumps employed for feeding material to the meltspinning operation can be easily changed within a few minutes and more particularly to a transmission assembly for permitting this change with the least interruption to the meltspinning operation.

In the manufacture of artificial threads and fibers from organic thermoplastic materials, such as polyvinyl esters, polyvinyl chlorides, polystyrenes, high polymer hydrocarbons, and synthetic linear polyamides, as well as polyethylene terephthalates and the like compounds, it is already known to employ the so-called bar- or ribbon-meltspinning process. According to this process the bar or ribbon of the polymeric material that is pushed or forced into the melting zone of the spinning head by means of a suitable transport device, serves as a pressure means for the mass of liquefied polymeric material present in the melting zone and consequently presses this liquefied mass through the filter and then through the spinning nozzle.

A spinning arrangement of this character has the advantage that it is relatively simple, and at the same time the melting zone may be made relatively small. The danger of oxidation, displacement of the polymerization equilibrium and crust formation in the melting zone is slight and the attention required to be given to the apparatus, especially in respect of cleaning, presents no particular difficulty.

However, the denier of the threads spun with this simple device tends to be irregular. The deviations may amount to about 5%, and sometimes even as high as 10%, and accordingly this device cannot be used for manufacturing artificial continuous threads where substantially uniform denier is a desideratum. At best it can only be employed for manufacturing staple fibers where absolute uniformity of denier is not a prerequisite.

Accordingly, continuous threads of the type indicated above have up to now been manufactured almost exclusively according to the so-called grid meltspinning process, in which grains or chips of the thermoplastic material are melted on a heated grid in the spinning head, whereupon the melt is forced through the spinning filter and spinning nozzle by means of a measuring pump and, if necessary, a pre-pressure pump provided ahead of the measuring pump, both pumps being present in the spinning head. With such an arrangement artificial threads having a sufficiently regular or uniform denier may readily be manufactured on a commercial scale.

The grid meltspinning device has many disadvantages, however. Thus, a rather large quantity of expensive nitrogen is required for maintaining in an oxygen-free condition the grains of polymeric material in the reservoir that is situated immediately before and connected to the melt spinning device as well as the empty space of the melting zone over the melt. The melting zone is comparatively large. Due to the relatively long period during which the molten polymeric material is subjected to elevated temperatures the polymerization equilibrium of the melt (e.g., that obtained by the polymerization of monomeric lactams to produce synthetic linear polyamides of the nylon type) may be shifted, and there is always a rather large quantity of molten polymeric material in the spinning head as a result of which the polymerization can proceed too far and oxidation may occur. Crusts form on the wall of the melting zone, and these contaminate the melt and necessitate repeated cleaning of the apparatus. Hence the spinning operation must often be interrupted with consequent loss of potential capacity of the apparatus.

Every time cleaning of the apparatus is required the heat of the surroundings, the complexity of the mechanisms in the spinning head, and the difficulty of dismantling and mounting the spinning pumps require much work and therefore greatly increase the labor cost involved in the spinning operation. Heretofore numerous attempts have been made to improve the ribbon meltspinning process in such a way that it would be possible to employ that process for spinning artificial threads of the kind indicated above having a regular or constant denier while at the same time avoiding at least some of the foregoing disadvantages.

To that end an improvement has already been made in the ribbon meltspinning apparatus in that the ribbon of high polymeric material that is pushed or forced into the apparatus is not caused to act as a stamp or press for dispensing or feeding the mass of molten polymer to and through the spinning nozzle, but instead a normal measuring pump or gear-wheel pump is mounted in the spinning head with the aid of which the molten polymeric material is forced through the spinning filter and to and through the spinning nozzle.

While it may indeed be necessary to somewhat increase the quantity of molten polymeric material in the melting zone anterior to the pump in comparison with the original ribbon meltspinning process, nevertheless the quantity of molten polymeric material is still much smaller than in the grid meltspinning process. In any case, however, the crust formation, the changes due to a shift in the polymerization equilibrium, and the contamination of the melt are much less than in grid meltspinning. Moreover, this arrangement has the very substantial advantage that the supply of the molten polymeric material can be more closely controlled, as a result of which artificial threads with a far more regular denier can be spun with ease.

However, this improved ribbon meltspinning device still has the disadvantage that the dismantling of the spinning pumps requires much time and trouble, because the pump shaft is usually connected directly with the motor.

It is therefore an object of the present invention to provide a new and improved device for ribbon meltspinning in which the spinning or gear wheel pump can easily be disconnected from the apparatus and dismantled in a very short time when the necessity for doing so arises. It is a further object of the invention to provide a new and improved apparatus for ribbon meltspinning that involves the use of a transmission assembly or device between the spinning pump coupling shaft and the drive shaft of the motor which can be readily rendered temporarily inoperative so as to facilitate adjustment and/or change-over of the spinning pump when desired. It is a further object of the invention to provide a simple and convenient arrangement of apparatus in which the desired change-over can be effected rapidly and with a minimum of trouble on the part of the machine operators.

The manner in which these and other objects and features of the invention are attained will be made clear from the following description of the invention, which is intended to be illustrative rather than limitative, According to the present invention, it has been discovered that greatly improved results can be obtained by providing means for separating the coupling shaft for the spinning pump and the driving shaft, and by providing between the two shafts a transmission device which is connected disengageably to at least the pump shaft and which, after being disengaged therefrom, can be swung out or away from normal operating position adjacent the spinning pump. The phrase "pump coupling shaft" is used herein to define the shaft which, when in coupled condition, is in alignment with the pump shaft proper.

It is to be understood that it is immaterial in what way and in what direction the transmission device is capable of being swung out or away, provided only the main objective is attained in that, after the transmission device has been swung out or away, it is then possible to remove the pump from the spinning head without difficulty, i.e., without being hindered by any of the mechanism.

It has been discovered that the apparatus operates best when the transmission device is capable of being swung out in a plane perpendicular to the pump shaft, i.e., in a perpendicular plane situated before or on the operating side of the machine. In such case the attendants who look after the machine can easily, while facing the spinning device, swing out the transmission device, e.g., upwards to the left or right or downwards to the left or right, without blocking the free entrance to the operating passage and at the same time giving full and easy access to the spinning pump and associated mechanism.

Preferably, the transmission device is connected disengageably with and rotatably around the driving shaft, which is parallel to the shaft of the spinning pump. With such an arrangement it is desirable for the driving shaft to be connected with the transmission device by means of a disengageable claw coupling or clutch.

The driving force can, for example, be transmitted between the driving shaft and the movable driving mechanism as well as between the driving mechanism and the pump coupling shaft by means of conical gear wheels, although ordinary spur gears are also entirely suitable for the purpose and are in fact described and illustrated herein.

According to the invention, in order to facilitate the movability of the pump coupling shaft, there is provided between the gear wheel of the driven shaft and the gear wheel of the pump coupling shaft a gear wheel that is arranged in such fashion as to be movable by means of distance or spacing rods or links attached to the shafts of these gear wheels. When moving or adjusting the pump coupling shaft, the transmission can be maintained despite such movement or adjustment by means of two gear wheels which are movable by means of the distance or spacing rods or links, or by means of one stationary gear wheel and one gear wheel which is movable by means of distance or spacing rods or links between the stationary gear wheel and the gear wheel of the pump coupling shaft.

Moreover, it may not be desirable to so construct and arrange the force transmission to the pump coupling shaft in an absolutely fixed manner, because a possible seizing or binding of the spinning pump mechanism during the spinning operation must also be taken into account. Therefore, in order to prevent breakdowns of the spinning machine due to this cause, according to the present invention the drive of the spinning pump—and preferably the coupling which connects the transmission mechanism which can be swung out with the spinning pump coupling shaft—is provided with a suitable safety device, e.g., a breaking or rupture disc.

Thus, the coupling between the transmission device and the pump coupling shaft is provided with a breaking member which automatically breaks the connection through the apparatus when a certain predetermined moment or force is for any reason exceeded. According to a particularly favorable embodiment the construction and arrangement are such that the counteracting moments or forces in the breaking member do not give rise to forces acting outwardly (as occur when employing a breaking pin) which forces make the magnitude of the maximum conceivable moment or force uncertain, and which therefore make it impossible to make a correct calculation as to how large the cross-section of the breaking pin should be for transmitting a precisely limited moment.

A breaking or rupture member according to the present invention does not have those disadvantages, and its dimensions may be calculated accurately according to the maximum permissible moment or force contemplated for the apparatus. Moreover, with such a breaking member the angular displacement before breakage occurs in the member is limited to a negligible minimum, and therefore it provides the distinct advantage that it can be manufactured in a simple way and can be arranged conveniently and in an easily accessible position.

In order still further to illustrate the present invention, reference is made to the accompanying drawings in which a preferred embodiment of the transmission device of the present invention and all the details thereof are indicated. In those drawings Figure 1 is a side elevation of the transmission device according to the invention as seen from the driving shaft side;

Figure 2 is a top plan view with certain parts shown in section;

Figure 3 is a detail sectional view on the line 3—3 of Figure 2;

Figure 4 is a detail sectional view on the line 4—4 of Figure 2;

Figure 5 is a transverse sectional view on the line 5—5 of Figure 1;

Figure 6 is a transverse sectional view on the line 6—6 of Figure 1; and

Figure 7 is a detail sectional view on the line 7—7 of Figure 6.

In the drawings, 10 indicates a driving shaft that drives the pump coupling shaft 20 through the gear wheels 12, 14, 16, 18. The shaft 20, which can be moved in axial direction, drives the spinning pump 22 shown in dotted lines in Figure 2 and fragmentarily in Figure 6. It will be understood, of course, that the spinning pump 22 is present in the apparatus as part of a spinning head containing the spinning nozzle (not shown).

The gear wheels 12, 14, 16 and 18 are situated in an elongated gear housing 24 and this entire housing is rotatable about the shaft 10 as a pivot, as indicated by the dotted arrows 26 shown at the left end of Figure 1. When the pump coupling shaft 20 is withdrawn from engagement with the spinning pump 22, i.e., in a direction toward the top as viewed in Figure 2 or toward the right as viewed in Figure 6, the housing 24 can be displaced from normal operating position in front of the spinning pump 22 by simply swinging it out of the way in a plane perpendicular to the shaft 10, thereby providing easy access for the machine attendant to work upon the spinning pump 22 and associated apparatus, either replacing same or repairing same or adjusting same as may be required by the exigencies of the situation.

The gear wheel 18 rotates the shaft 20 via the bushing 30 to which it (18) is securely attached but in which bushing the shaft 20 may freely turn, the bushing 30 being securely connected with the ring 32 (see Figure 6). Attached securely to the ring 32 are driving pins 34 which project into slots 36 of a breaking or rupture disc 38 (see Figure 7). The breaking or rupture disc 38 is mounted in positive driving relationship to the shaft 20, e.g., by milling the end of the shaft 20 in the form of a square to conform to the slightly larger square central opening of the disc 38, as shown in Figure 7. The disc 38 is held in driving position upon the shaft 20 by means of a knob or wheel 40 which is attached to and held in place upon the square end of the shaft 20 by means of setscrew 42.

By drawing the shaft 20 out by means of the knob 40, i.e., moving the shaft 20 in a direction toward the top of the drawing as shown in Figure 2 and toward the right of the drawing as shown in Figure 6, the drive connection between the breaking or rupture disc 38 and the driving pins 34 is interrupted, thus in effect severing the driving connection between the gear wheel 18 and the shaft 20.

If, during or as a consequence of the spinning operation, a breakdown should occur in the spinning pump 22 as a result of which the shaft 20 offers an abnormally high resistance to rotation, the rupture disc 38 will break thereby automatically interrupting the force transmitted from the gear wheel 18 to the shaft 20 so that the drive to the spinning pump 22 is immediately interrupted.

In order to prevent undesired axial movement of the shaft 20, a groove 50 is provided therein at a point along the shaft such that in normal operating position the groove is located approximately midway of the region defined by the hub of the gear wheel 18 that is connected to the bushing 30. The hub of the gear wheel 18 is provided with a plurality of counterbored recesses 52 (see Figure 2) each one of which is adapted to hold a pin or detent 54 having a pointed end which corresponds in section to the section of the groove 50. Each of the pins or detents 54 is biased toward engagement with the groove 50 by a compression spring 56 which in turn is held in position by a setscrew 58. It will be apparent that by this construction the shaft 20 is normally held or latched in fixed position along its axis by means of the spring-biased pins or detents 54, the springs 56 being sufficiently strong to maintain the desired longitudinal position of the shaft 20 but being insufficiently strong to prevent the shaft 20 from being disengaged from the spinning pump 22 when the knob 40 which is attached to the shaft 20 is firmly grasped and pulled to the right as viewed in Figure 6.

Returning now to a consideration of the breaking or rupture disc 38 shown in detail in Figure 7, this disc preferably has a thickness of from 1 to 2 mm. and is provided with a plurality of openings 60 which are separated from each other by only a short distance, leaving only relatively thin webs of material 62 between the openings 60 to transmit the entire forces involved in placing the transmission device in operative engagement with the spinning pump 22. The shortest distance between the openings 60, i.e., the width of the webs 62, is made as small as is necessary having regard to the forces to be transmitted and the strength of the material of construction of the disc 38. This distance, i.e., the width of the webs 62, is formed by two parallel lines, extending in a non-radial direction with respect to the disc, over a length of more than 0 and less than 0.5 mm., in order to permit the shortest possible zone of high forces or tension in the material of the breaking disc. In other words, the part of the breaking disc having the shortest distance between the openings 60, i.e., the width of the webs 62, should not be too great as otherwise shocks to which the transmission device might be subjected during the spinning operation might be taken up by stretching or deformation of the breaking disc 38 without breakage of the thin sections occurring, thus defeating the purpose of this portion of the device. In the particular construction of breaking disc shown, the short length with the maximum material tension makes it certain that the breaking or rupture disc will indeed break in case of a shock that might otherwise damage one or more permanent members of the transmission device or of the spinning apparatus proper.

It is also important to note that the breaking or rupture disc 38 is so proportioned that the forces occurring in the section having the smallest width or dimension, i.e., the width of the webs 62, are directed almost tangentially. With this construction it becomes possible to arrange it so that substantially only pure tensile stresses occur in the narrow sections or webs 62 between the openings 60. The construction and arrangement of the breaking member must be such that no, or substantially no, forces acting outwardly occur, and this is achieved in a simple manner by taking particular care to center the inside with respect to the outside of the breaking member.

On mounting a new spinning pump 22 in the spinning head, it may sometimes occur that the center of the new pump is not exactly in alignment with the center of the pump coupling shaft 20. It therefore becomes necessary to provide means for adjusting the shaft 20 in a horizontal as well as a vertical direction (in a plane perpendicular to the shaft 20), without disturbing the gear wheels 12, 14, 16 and 18. For that purpose the gear wheel 16 is mounted on a shaft 66 (see Figures 1 and 2) to which in turn are connected two distance or spacing rods or links 70 and 72 in such manner that they may turn about the shaft 66. Gear wheel 14 is mounted on a shaft 74 journaled in a wall of the housing 24. The distance or spacing rod or link 70 is also attached to the shaft 74 in such manner that it is rotatable about that shaft. The distance or spacing rod or link 72 is similarly connected upon a concentric bushing surrounding the shaft 20 in such fashion as to be rotatable thereabout. When the shaft 20 is moved to the left (as shown in Figure 1), the gear wheel 18 carried by the shaft 20 will also move to the left whereupon the gear wheel 16 will move downwardly supported in part by the distance or spacing rods or links 70 and 72. In this way the transmission between the gear wheels 14 and 18 is maintained when the shaft 20 is moved either to the left or the right.

The shaft 20 is moved to the desired position with respect to the spinning pump 22 by means of eccentric bushings 80 and 82 (see Figure 6). After unscrewing the nuts 84 and 86, the eccentric bushings 80 and 82 can be turned and if both are turned simultaneously the shaft 20 moves in a circle according to the eccentricity of the bushings 80 and 82. After the shaft 20 has been moved over the desired horizontal distance, which distance will always be small, the vertical deviation (if any) of the shaft 20 with respect to the pump 22 may be readily corrected by rotating the entire housing 24 the desired amount about the shaft 10 by means of the adjusting screw 90 (see Figure 1). The adjusting screw is rotatable in an ear 92, fixed to the housing of the spinning machine not shown, and presses against a lug 94 which may be a part of the housing 24. After this combined movement of the shaft 20, the nuts 84 and 86 are tightened again whereupon the coupling shaft 20 can be put into operative engagement with the spinning pump 22 thus rendering the latter operable for the spinning function.

During the manipulation with the shaft 20 and also during the time when the spinning pump is being changed or otherwise worked upon, it is desirable that the gear wheel 18 should be rendered stationary. Furthermore, it is also desirable to arrange that after inserting a new spinning pump 22, the shaft 20 can be rotated by hand so that it can be established whether or not the pump operates correctly before resuming the regular spinning operation. In order to render this possible, the shaft 10 is provided with means for disconnecting it from the gear train 12, 14, 16, 18 of the transmission device. That is to say, the shaft 10 is provided with means for disconnecting it from the remainder of the transmission device so that this shaft need not be stopped when exchanging or repairing or adjusting the spinning pump or otherwise purposely disrupting the spinning operation. For this purpose a disengagable claw coupling or clutch is provided between the shaft 10 and its gear wheel 12, as shown in Figure 2 and in greater detail in Figures 4 and 5.

Referring more particularly to Figure 5, it will be observed that the clutch 100 consists of two clutch plates bearing intermeshing teeth (as shown also in Figure 2) when the clutch is in engaged position. One of the series of teeth may be formed directly in a side face of the gear wheel 12 and these teeth mesh with the teeth on the meshing clutch plate 102, this clutch plate 102 being normally biased into engagement with the clutch teeth on the gear wheel 12 by spring 104 which is held under compression against the shoulder 106 of a concentric bushing 108 which in turn is affixed to the shaft 10 by means of a key 110. The gear wheel 12 is positioned on the bushing 108 surrounding the lower end of the shaft 10 (left hand end as seen in Figure 5) by means of a suitable ball bearing assembly 112 in conventional fashion.

For the purpose of throwing out or rendering the clutch inoperative, a pin 122 is inserted in a hole drilled axially in the end of the shaft 10 and extending to a distance slightly beyond the hub of the clutch plate 102. The pin slides in the hole and its inner end terminates a little distance from the end of the hole. Both the end of the shaft 10 and the bushing 108 are slotted as shown in Figure 5, and in greater detail in Figure 4, and both the hub of the clutch plate 102 and the pin 122 are drilled in such fashion as to permit secure engagement by a cross pin 120 thereby connecting the clutch plate 102 and the pin 122 with the cross pin 120 free to move in the slotted region of shaft 10 and bushing 108. A screw provided with a knob 130 is located in the housing 24 with the end thereof directly opposite the outer end of the pin 122.

It is therefore apparent from this construction that when the knob 130 is screwed inwardly the inner end of the screw will ultimately come to bear upon the outer end of the pin 122 and continued turning will cause the pin 122 to slide into the shaft 10, i.e., to the right as shown in Figure 5, carrying with it pin 120 and hence the clutch plate 102 to the right against the spring 104, thereby bringing about disengagement of the clutch 100, as a consequence of which the shaft 10 can continue to rotate entirely free of operative engagement with the gear wheel 12 and hence with the remaining gears in the transmission device, thereby permitting the machine operator to exchange spinning pumps, test the spinning pump, etc., at will.

It is believed to be apparent from the foregoing description of the operation and construction of the apparatus according to the present invention that the objects of the invention as set forth above have been achieved in full.

The foregoing description has been given as illustrative only, and without intending to limit the invention which is defined in the following claims.

What is claimed is:

1. A transmission assembly comprising an elongated housing, a rotatable drive shaft extending outwardly from within one end of said housing, a rotatable driven shaft extending outwardly from within the other end of said housing, said driven shaft being axially movable with respect to said housing between an operative and an inoperative position, drive transmitting means within said housing interconnecting said drive and driven shafts whereby rotaton of the former may be imparted to the latter, said drive transmitting means including a member operable to disconnect said driven shaft from said drive shaft upon axial movement of said driven shaft into inoperative position, and means for rotatably adjusting said housing about the axis of said drive shaft.

2. A transmission assembly comprising an elongated housing, a rotatable drive shaft extending outwardly from within one end of said housing, a rotatable driven shaft extending outwardly into operative poistion from within the other end of said housing, the projecting end of said driven shaft being axially retractable toward said housing into inoperative position, means within said housing interconnecting said drive and driven shafts whereby rotation of the former may be imparted to the latter, said means including a disc operable to disconnect said driven shaft from said drive shaft in response to retraction of said driven shaft into inoperative position and to rupture upon application of a load in excess of a predetermined amount.

3. A transmission assembly as set forth in claim 2 wherein said disc comprises a plurality of webs extending in a non-radial direction, whereby tensile stresses only are transmitted through said disc.

4. A transmission assembly for a melt spinning apparatus comprising an elongated gear housing, a rotatable drive shaft extending outwardly from within one end of said housing, a rotatable driven shaft extending outwardly into operative position from within the other end of said housing, the projecting end of said driven shaft being axially retractable into inoperative position within said housing, eccentric bushings supporting said driven shaft, said bushings being rotatably mounted in said housing whereby the driven shaft may be adjusted laterally with respect to said drive shaft and said housing, means including gears within said housing interconnecting said drive and driven shafts whereby rotation of the former may be imparted to the latter, said means also including a rupture disc non-rotatably supported by said driven shaft, and pins fixed with respect to one of said gears, said pins cooperating with said disc to connect said driven shaft to said gears in said operative position and to disconnect said driven shaft from said gears in response to retraction of said driven shaft into inoperative position.

5. A transmission assembly comprising an elongated housing, a rotatable drive shaft extending outwardly from within one end of said housing, a rotatable driven shaft extending outwardly into operative position from within the other end of said housing, the projecting end of said driven shaft being axially retractable toward said housing into inoperative position, drive transmitting means within said housing interconnecting said drive and driven shafts whereby rotation of the former may be imparted to the latter, said drive transmitting means including a member operable to disconnect said driven shaft from said drive shaft in response to retraction of said driven shaft into inoperative position, and additional means within said housing for quick-releasably latching said driven shaft in operative position.

6. A transmission assembly comprising an elongated housing, a rotatable drive shaft extending outwardly from within one end of said housing, a rotatable driven shaft extending outwardly into operative position from within the other end of said housing, the projecting end of said driven shaft being axially retractable toward said housing into inoperative position, drive transmitting means within said housing interconnecting said drive and driven shafts whereby rotation of the former may be imparted to the latter, said drive transmitting means including a member operable to disconnect said driven shaft from said drive shaft in response to retraction of said driven shaft into inoperative position, and additional means for adjusting the axis of said driven shaft laterally with respect to said housing.

7. A transmission assembly comprising an elongated housing, a rotatable drive shaft extending outwardly from within one end of said housing, a rotatable driven shaft extending outwardly from within the other end of said housing, said driven shaft being axially movable with respect to said housing between an operative and an inoperative position, drive transmitting means within said housing interconnecting said drive and driven shafts whereby rotation of the former may be imparted to the latter, said drive transmitting means including a member operable to disconnect said driven shaft from said drive shaft upon axial movement of said driven shaft into inoperative position and a clutch operatively connecting said drive shaft and said drive transmitting means, a pin connected to said clutch and extending axially from said drive shaft, and means supported by said elongated housing for axially displacing said pin and clutch, thereby disconnecting said drive shaft from said drive transmitting means.

References Cited in the file of this patent

UNITED STATES PATENTS

| | | |
|---|---|---|
| 567,614 | Rieppel | Sept. 15, 1896 |
| 780,490 | Anderson | Jan. 24, 1905 |
| 916,237 | Whitney | Mar. 23, 1909 |
| 1,428,302 | Schroder | Sept. 5, 1922 |
| 1,684,633 | Levedahl | Sept. 18, 1928 |
| 2,349,156 | Fischer | May 16, 1944 |
| 2,522,960 | Price | Sept. 19, 1950 |
| 2,642,756 | Cummings | June 23, 1953 |

FOREIGN PATENTS

| | | |
|---|---|---|
| 675,621 | Great Britain | Apr. 13, 1950 |